United States Patent
Mikami et al.

(10) Patent No.: US 10,178,298 B2
(45) Date of Patent: Jan. 8, 2019

(54) IMAGE PROCESSING DEVICE, IMAGE PROCESSING METHOD, AND RECORDING MEDIUM FOR OPTIMAL TRIMMING OF A CAPTURED IMAGE

(71) Applicant: SONY CORPORATION, Tokyo (JP)

(72) Inventors: Masanori Mikami, Kanagawa (JP); Yoko Fukata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 14/649,337

(22) PCT Filed: Nov. 15, 2013

(86) PCT No.: PCT/JP2013/080934
§ 371 (c)(1),
(2) Date: Jun. 3, 2015

(87) PCT Pub. No.: WO2014/097789
PCT Pub. Date: Jun. 26, 2014

(65) Prior Publication Data
US 2016/0021296 A1 Jan. 21, 2016

(30) Foreign Application Priority Data
Dec. 20, 2012 (JP) ................................. 2012-277954

(51) Int. Cl.
*H04N 5/232* (2006.01)
*H04N 5/77* (2006.01)

(52) U.S. Cl.
CPC ..... *H04N 5/23212* (2013.01); *H04N 5/23235* (2013.01); *H04N 5/23258* (2013.01); *H04N 5/23293* (2013.01); *H04N 5/772* (2013.01)

(58) Field of Classification Search
CPC .... H04N 5/23212; H04N 5/2356; G02B 7/04; G02B 7/28; G03B 3/00; G03B 13/18
See application file for complete search history.

(56) References Cited

U.S. PATENT DOCUMENTS

| | | | | |
|---|---|---|---|---|
| 2003/0025812 | A1* | 2/2003 | Slatter | H04N 5/23293 348/240.2 |
| 2006/0072174 | A1* | 4/2006 | Koike | H04N 1/3875 358/537 |
| 2006/0216017 | A1* | 9/2006 | Ono | G06K 9/00664 396/281 |
| 2007/0223047 | A1* | 9/2007 | Kameyama | H04N 5/2628 358/302 |
| 2008/0002028 | A1* | 1/2008 | Miyata | H04N 5/225 348/169 |
| 2008/0025558 | A1* | 1/2008 | Nozawa | G06K 9/00228 382/100 |

(Continued)

FOREIGN PATENT DOCUMENTS

| | | |
|---|---|---|
| JP | 2008-187260 A | 8/2008 |
| JP | 2008-219696 A | 9/2008 |
| JP | 2010-102596 A | 5/2010 |

*Primary Examiner* — Mekonnen D Dagnew
(74) *Attorney, Agent, or Firm* — Chip Law Group (57) ABSTRACT

Provided is an image processing device including an image state detection unit which detects a state of a captured image after a processing for determining a captured image has been performed, and a trimming-decision processing unit which performs a trimming decision of the captured image based on a state of the captured image.

13 Claims, 7 Drawing Sheets

(56) References Cited

U.S. PATENT DOCUMENTS

| | | | | |
|---|---|---|---|---|
| 2008/0211928 A1* | 9/2008 | Isomura | .................. | H04N 5/262 348/231.99 |
| 2009/0303351 A1* | 12/2009 | Ogawa | ............... | H04N 5/23248 348/231.6 |
| 2011/0018970 A1* | 1/2011 | Wakabayashi | ....... | H04N 5/2251 348/47 |
| 2013/0329067 A1* | 12/2013 | Niida | ................. | H04N 5/23206 348/211.99 |

* cited by examiner

IMAGE PROCESSING DEVICE, IMAGE PROCESSING METHOD, AND RECORDING MEDIUM FOR OPTIMAL TRIMMING OF A CAPTURED IMAGE

TECHNICAL FIELD

The present disclosure relates to an image processing device, an image processing method, and a recording medium.

BACKGROUND ART

Recently, imaging apparatuses such as a digital still camera are widely prevalent, and it is possible to photograph an object using a face-detection technology, an auto focusing technology and the like. However, an adjustment of a composition at photographing depends on a user's skill, and a photographed image is not always well balanced in composition. Therefore, in recent years, there has been proposed a technology in which an extraction of a human face or an object, a tracking and others are performed, and a trimming (clipping) of it is automatically performed so as to provide a good composition.

For example, Patent Literature 1 discloses technology in which it is assumed that a main object is extracted from an image, and noise is added to a region for the position of the main object within the image.

CITATION LIST

Patent Literature

Patent Literature 1: JP 2008-187260A

SUMMARY OF INVENTION

Technical Problem

Searching for an object on the basis of the position at which a focus is matching within an angular field, and performing trimming in accordance with the searched object, can be considered as an algorithm which extracts an object. However, in the case where this method is applied, for example, in the case where a user changes the angular field in a state where the focus is fixed to the position of an object by a focus lock or the like, the object will be extracted according to the position of the focus, and so there will be the possibility that an object is extracted which is different from the object to which the focus was originally matched, in accordance with the change of the angular field. Accordingly, there will be the problem in which an object is extracted which is different from an object intended by a user to be captured by matching the focus, and is not that intended by the user to be extracted. Similarly, in the case where a captured image has changed by the orientation of an imaging apparatus changing after a processing for determining a captured image has been performed or the like, there will be the problem in which it is not that intended by the user to be extracted.

Accordingly, performing optimal trimming, without an object being extracted which is different from that intended by a user, has been sought after.

Solution to Problem

According to the present disclosure, there is provided an image processing device including an image state detection unit which detects a state of a captured image after a processing for determining a captured image has been performed, and a trimming-decision processing unit which performs a trimming decision of the captured image based on a state of the captured image.

A trimming processing unit which performs a trimming processing of the captured image based on the trimming decision may be further included.

The processing for determining a captured image may be a processing for locking a focus of the captured image.

The image state detection unit may detect a change of a state of the captured image due to a change of an angular field of the captured image, or a change of a state of the captured image due to a change of orientation of an device which captures the captured image.

The trimming-decision unit may decide that trimming of the captured image is not performed in a case where the image state detection unit has detected a change of a state of the captured image.

The image state detection unit may detect whether or not the captured image is a uniform image.

The trimming-decision unit may decide that trimming of the captured image is not performed in a case where the image state detection unit has detected that the captured image is a uniform image.

The image state detection unit may detect a dissimilarity between a trimming image of the captured image determined in accordance with the processing for determining a captured image, and an original image prior to trimming.

The trimming-decision unit may decide that trimming of the captured image is not performed in a case where the image state detection unit has detected that a difference between a trimming image of the captured image and an original image prior to trimming is equal to or less than a prescribed value.

According to the present disclosure, there is provided an image processing method including detecting a state of a captured image after a processing for determining a captured image has been performed, and performing a trimming decision of the captured image based on a state of the captured image.

According to the present disclosure, there is provided a recording medium having a program recorded thereon, the program causing a computer to execute a process, the process including detecting a state of a captured image after a processing for determining a captured image has been performed, and performing a trimming decision of the captured image based on a state of the captured image.

Advantageous Effects of Invention

According to an embodiment of the present disclosure, it becomes possible to perform optimal trimming, without an object being extracted which is different from that intended by a user.

DESCRIPTION OF EMBODIMENTS

Preferred embodiments of the present disclosure will be described in detail below with reference to the accompanying drawings. Here, in the description and drawings, as for components having a substantially identical function and configuration, an identical reference sign is assigned, and thereby, repetitive explanations therefor are omitted.

Note that, the description will be given in the following order.
1. First embodiment
1.1. Configuration example of the imaging apparatus
1.2. Main processing performed by the digital signal processing unit
1.3. Trimming decision based on an image state change
2. Second embodiment
2.1. Outline of the second embodiment
2.2. Processing of the second embodiment
2.3. Trimming decision based on an image state change
3. Third embodiment
3.1. Outline of the third embodiment
3.2. Processing of the third embodiment
3.3 Trimming decision based on an image state change
<1. First Embodiment>
[1.1. Exemplary Configuration of Imaging Apparatus]

Figure 1:
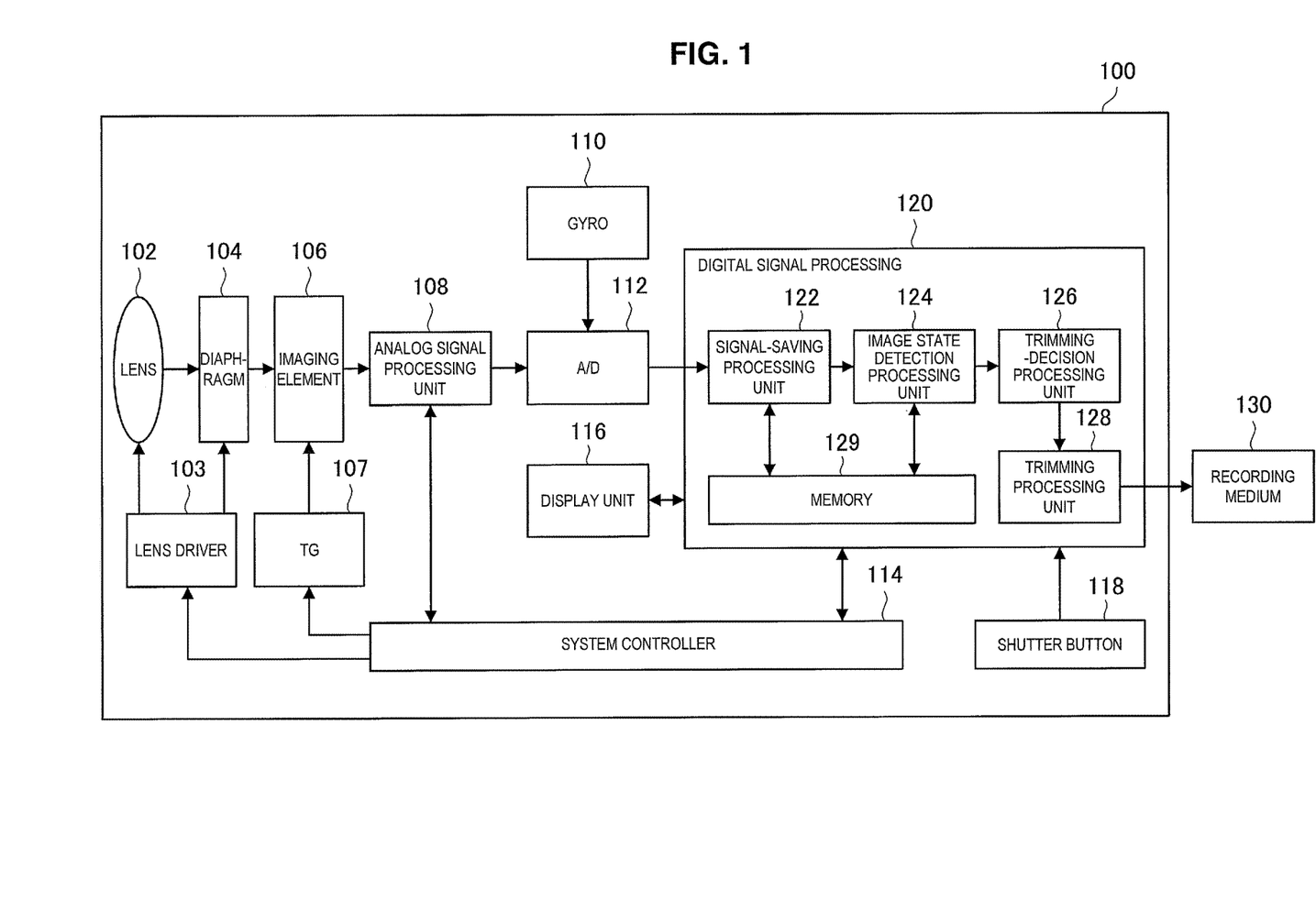
FIG. 1 is a cross-sectional view which shows a schematic configuration of an imaging apparatus according to each of the embodiments of the present disclosure.

First, a schematic configuration of an imaging apparatus 100 according to embodiments of the present disclosure will be explained with reference to FIG. 1. As shown in FIG. 1, the imaging apparatus 100 includes a lens 102, a lens driver 103, a diaphragm 104, an imaging element 106, a timing generator (TG) 107, an analog signal processing unit 108, a gyro sensor 110, an A/D conversion unit 112, a system controller 114, a display unit (LCD) 116, a shutter button (operation member) 118 and a digital signal processing unit 120. Also, a recording medium 130 is externally connected to the imaging apparatus 100.

The digital signal processing unit 120 is configured to include, for example, a central processing unit (CPU), and includes a signal-saving processing unit 122, an image state detection processing unit 124, a trimming-decision processing unit 126, a trimming processing unit 128, and a memory 129. For example, by programs that are stored in a memory or the like, the central processing unit (CPU) can function as the components of the digital signal processing unit 120. The programs can be recorded in a memory included in the imaging apparatus 100, a memory that is externally connected to the imaging apparatus 100, or the like.

In the configuration shown in FIG. 1, an object image is formed on an imaging surface of the imaging element 106 by the lens 102. The lens 102 and the diaphragm 104 are driven by the lens driver 103. The lens driver 103 drives the lens 102 to regulate its focus and zooming (angular field). Furthermore, the lens driver 103 drives the diaphragm to regulate the amount of light for an object.

The imaging element 106, which is a CMOS sensor, a CCD sensor or the like, performs a photoelectric conversion of the object image and then outputs it as image signals. The timing generator 107 generates timing signals in driving of the imaging element 106. The analog signal processing unit 108 performs an analog signal processing to the image signals. The gyro sensor 110 detects a motion of the imaging apparatus 100. The A/D conversion unit 112 converts the image signals, which are analog signals, into digital image data. Also, the A/D conversion unit 112 converts gyro signals, which are analog signals, into digital data.

The image data that the A/D conversion unit 112 generates by A/D conversion are transmitted to the digital signal processing unit 120. Also, the gyro signals that the A/D conversion unit 112 generates by A/D conversion are transmitted to the digital signal processing unit 120. The signal-saving processing unit 122 of the digital signal processing unit 120 performs a processing to save an image data to the memory 129. The image state detection unit 124 extracts a state of the image from the image data.

The trimming-decision processing unit 126 decides (determines) trimming in accordance with a main object, and decides trimming of an object image, based on the state of the image detected by the image state detection unit 124. The trimming processing unit 128 performs a trimming processing, based on a decision result of the trimming-decision processing unit 126. A trimming image to which the trimming processing has been performed, and an original image prior to the trimming processing being performed, are displayed on the display unit 116.

The system controller controls the lens driver 103, the timing generator 107, the analog signal processing unit 108, and the digital signal processing unit 120.

[1.2. Main Processing Performed by the Digital Signal Processing Unit]

Figure 2:
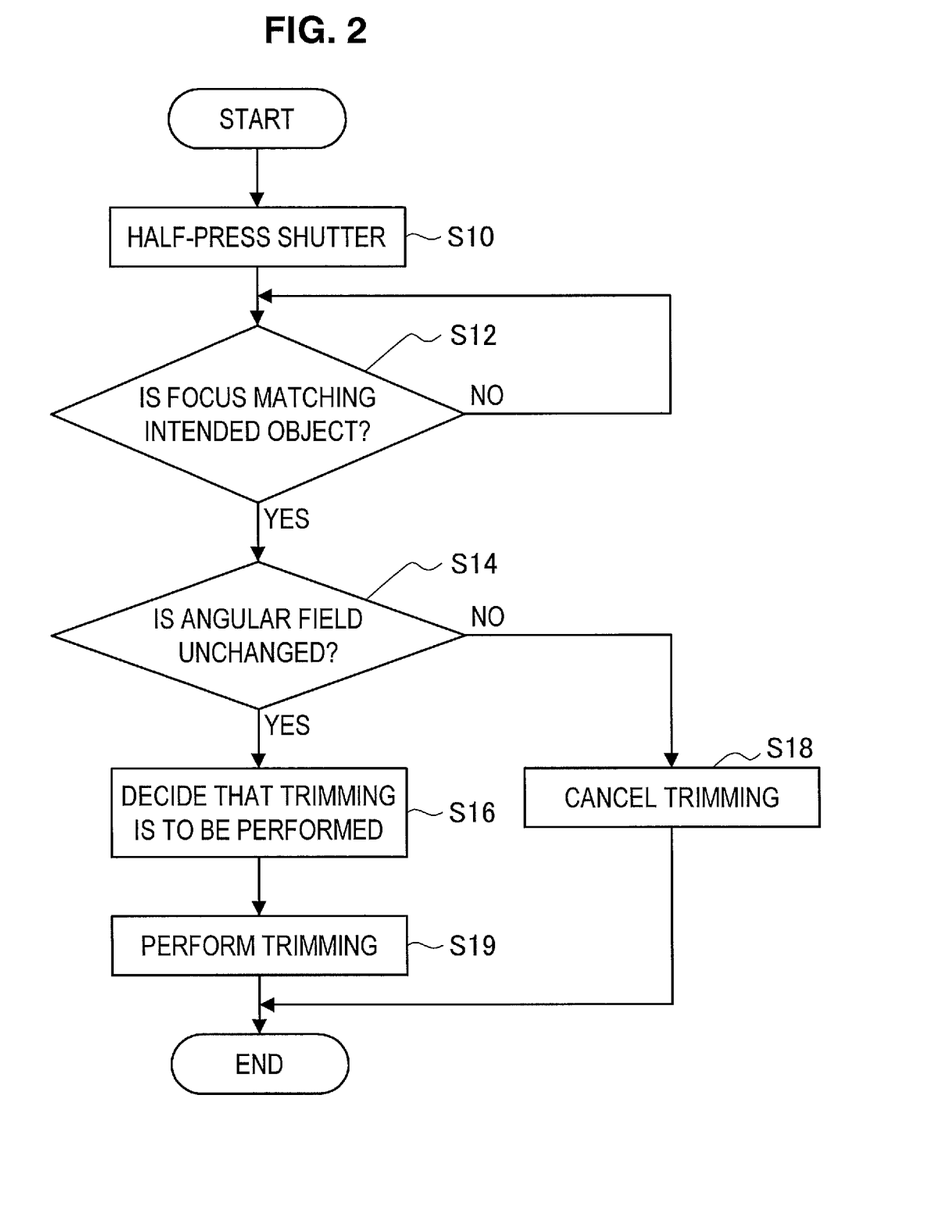
FIG. 2 is a flow chart which shows the main processing performed by a digital signal processing unit.

Next, the main processing performed by the digital signal processing unit 120 will be described based on the flow chart of FIG. 2. First, in step S10, the shutter button 118 is half-pressed by a user. In this way, a focus operation which matches the focus to an object is performed. Next, in step S12, it is decided whether or not the focus is matching an intended object. In the case where the focus is matching an intended object, since a processing for determining a captured image is to be performed, it proceeds next to step S14. On the other hand, in the case where the focus is not matching an intended object, it stands by at step S12.

In step S14, it is decided whether a state of the image is unchanged, in a state where the focus is matching an intended object. Here, a change of the state of the image includes a change of the angular field due to a zoom, a change due to a change of orientation (pan tilt operation or the like) of the imaging apparatus 100 or the like. A change of state of the image is decided by the image state detection unit 124. The image state detection unit 124 stores the color and luminance of a number of regions within a captured image, and judges that a state of the image has changed if there is a change in the color or luminance of a same region. Further, the image state detection unit 124 monitors a gyro signal, and judges that the state of the image has changed when there is a large change in this value. In addition, the image state detection unit 124 can judge that the state of the image has changed in the case where information of a zoom has changed, based on information of the zoom (focal length information). In step S14, in the case where the state of the image has not changed, it proceeds to step S16, and in the case where the state of the image has changed, it proceeds to step S18.

In step S16, since the state of the image has not changed, it is decided that trimming is to be performed in accordance with an intended object. On the other hand, in step S18, since the state of the image has changed, a decision is performed to cancel trimming. These decisions are performed by the trimming-decision processing unit 126. After step S16, it proceeds to step S19. In step S19, the trimming processing unit 128 performs a trimming processing, based on a decision result of the trimming-decision processing unit 126.

[1.3. Trimming Decision Based on an Image State Change]

Figure 3:
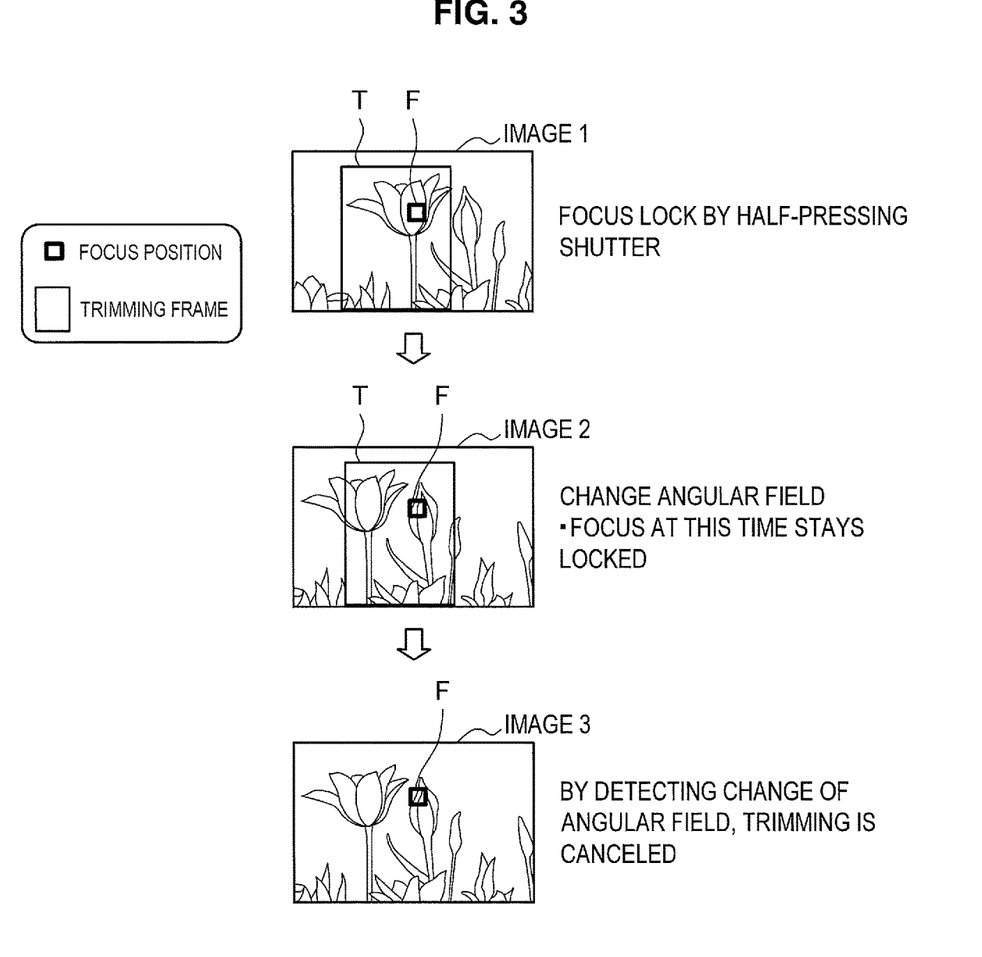
FIG. 3 is a schematic diagram which shows the processes from a focus lock up to a trimming decision.

Next, a trimming decision based on a change of the image state, according to the present embodiment, will be described in detail based on FIG. 3. FIG. 3 is a schematic diagram which shows the processes from a focus lock up to a trimming decision. First, as shown in image 1, a user matches a focus position F to a "flower" positioned in the center, and performs a focus lock by half-pressing the shutter button 118. In this way, a trimming frame T is set by matching to the object "flower" which has been focus locked.

Next, as shown in image 2, the state of the image in a state which has been focus locked is changed. In the example of image 2, the orientation of the lens 102 of the imaging apparatus 100 has moved to the right, with respect to the "flower" which is the object, and the "flower" has moved to the left side within the screen.

Accordingly, in the next image 3, a decision is performed to cancel trimming, by detecting a change of the state of the image. In this way, the trimming frame T is deleted.

As described above, in the case where the state of the image in a state which has been focus locked has changed, having to perform trimming, which is not suitable for the "flower" which is the main object, can be reliably avoided by cancelling trimming.

According to the first embodiment such as described above, in the case where the state of an image has changed after determining a main object, the setting of the trimming frame T is cancelled. Therefore, it becomes possible to reliably suppress having to perform trimming for an object which is not intended by a user. In this way, it becomes possible to perform trimming which is more suitable for a user.

<2. Second Embodiment>

[2.1. Outline of the Second Embodiment]

Next, a second embodiment of the present disclosure will be described. In the second embodiment, in the case where the state of the image has been detected by the image state detection processing unit 124, and in the case where the trimming image is a uniform image, trimming is canceled. Trimming is usually performed for enlarging and displaying a main object within a screen frame, in which the main object exists. On the other hand, in the case where an image is uniform, since a main object does not exists, the necessity does not occur to again perform trimming. Accordingly, in the second embodiment, in the case where an image to be captured is a uniform image (for example, an image such as the sky and sea, the ground, a lawn of a park), a processing is performed to cancel trimming. In this way, in the case of a uniform image in which a main object does not exist, it is possible to suppress having to perform trimming.

[2.2. Processing of the Second Embodiment]

Figure 4:
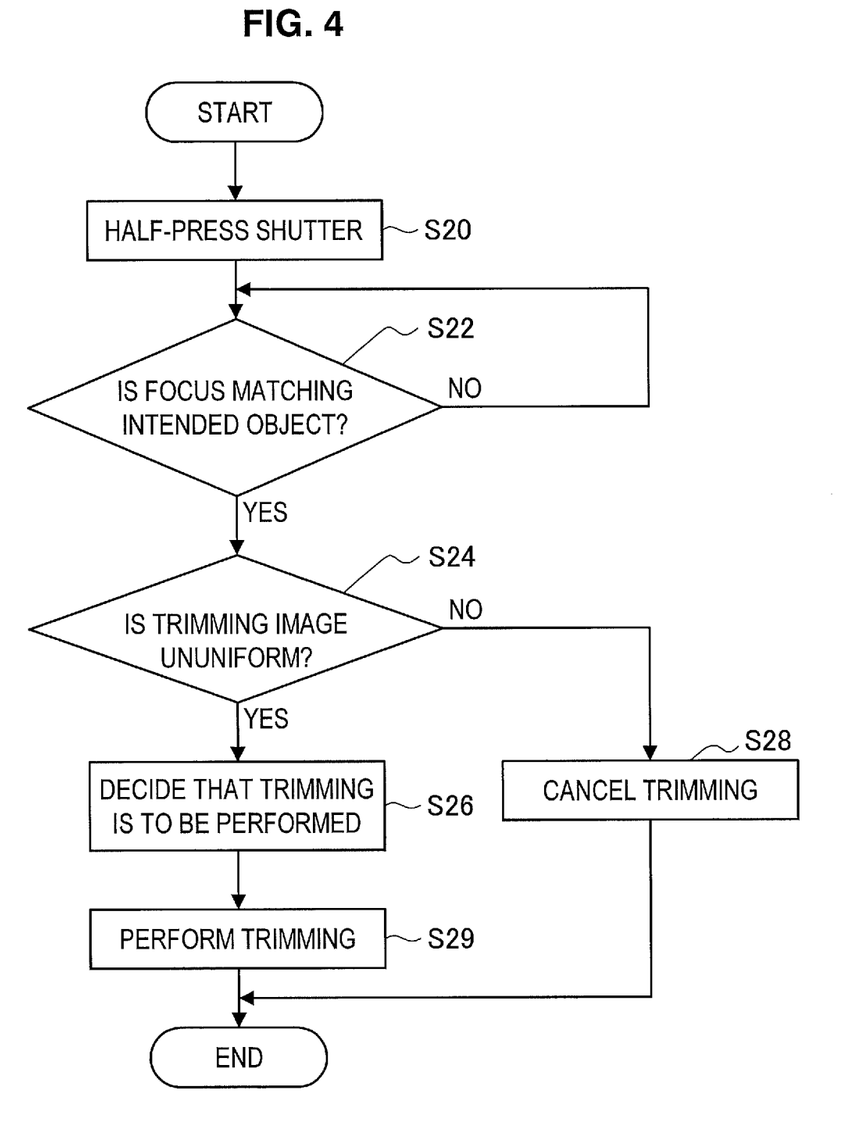
FIG. 4 is a flow chart which shows the processing of a second embodiment of the present disclosure.

FIG. 4 is a flow chart which shows the processing of the second embodiment. First, in step S20, the shutter button 118 is half-pressed by a user. In this way, a focus operation which matches the focus to an object is performed. Next, in step S22, it is decided whether or not the focus is matching an intended object. In the case where the focus is matching an intended object, it proceeds next to step S24. On the other hand in the case where the focus is not matching an intended object, it stands by at step S22.

In step S24, it is decided whether the trimming image is ununiform, in a state where the focus is matching an intended object. Here, whether or not the trimming image is uniform is decided by the image state detection processing unit 124. The image state detection processing unit 124 analyses the distribution of the color and luminance of the trimming image, for example, and judges that the trimming image is uniform if this distribution is biased. In the case where the trimming image is not uniform, it proceeds to step S26, and in the case where it is uniform, it proceeds to step S28.

In step S26, since the trimming image is not a uniform image, it is decided that trimming is to be performed. On the other hand, in step S28, since the trimming image is a uniform image, a decision is performed to cancel trimming. These decisions are performed by the trimming-decision processing unit 126. After step S28, it proceeds to step S29. In step S29, the trimming processing unit 128 performs a trimming processing, based on a decision result of the trimming-decision processing unit 126.

[2.3. Trimming Decision Based on an Image State Change]

Figure 5:
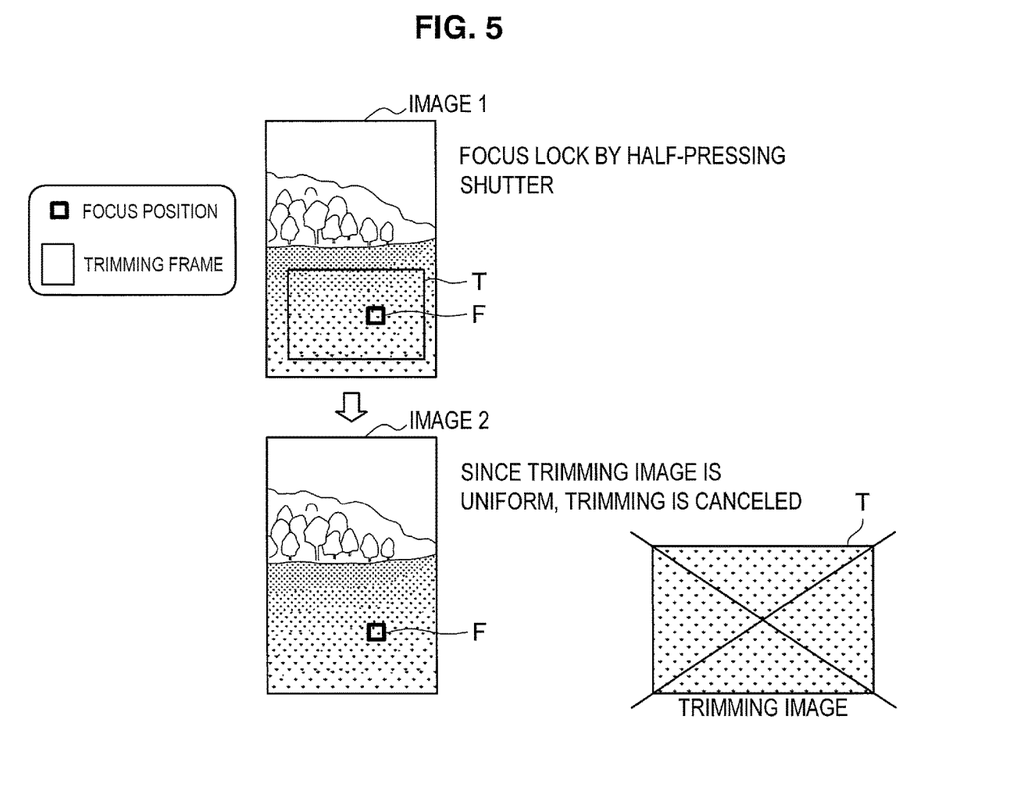
FIG. 5 is a schematic diagram which shows the processes from a focus lock up to a trimming decision.

Next, a trimming decision based on a change of the image state, according to the present embodiment, will be described in detail based on FIG. 5. FIG. 5 is a schematic diagram which shows the processes from a focus lock up to a trimming decision. First, as shown in image 1, a user matches a focus position F to a "lawn" of the ground on the screen lower side, and performs a focus lock by half-pressing the shutter button 118. In this way, a trimming frame T is set by matching to the object "lawn" which has been focus locked.

Next, it is decided whether or not the image (trimming image) within the trimming frame T in a state which has been focus locked is uniform. In the example of image 1, the "lawn" within the trimming frame T is a uniform green color, and the trimming image is a uniform image. Therefore, a decision is performed to cancel trimming by the trimming frame T. In this way, the trimming frame T is deleted from on the screen.

As described above, in the case where the trimming image is a uniform image, having only a uniform image trimmed can be reliably avoided by cancelling trimming.

According to the second embodiment such as described above, in the case where the trimming image is a uniform image, trimming is cancelled, and so it becomes possible to reliably avoid having only a uniform image trimmed.

<3. Third Embodiment>

[3.1. Outline of the Third Embodiment]

Next, a third embodiment of the present disclosure will be described. In the third embodiment, in the case where the state of the image has been detected by the image state detection processing unit 124, and in the case where the size of an original image and the size of a trimming image are approximately the same, trimming is canceled. In the case where the trimming image has been determined in accordance with a main object, if the size of an original image prior to trimming is approximately the same as that of a trimming image, the necessity for performing trimming will be low. Accordingly, in the third embodiment, in the case where the size of an original image and the size of a trimming image are approximately the same, trimming is cancelled.

[3.2. Processing of the Third Embodiment]

Figure 6:
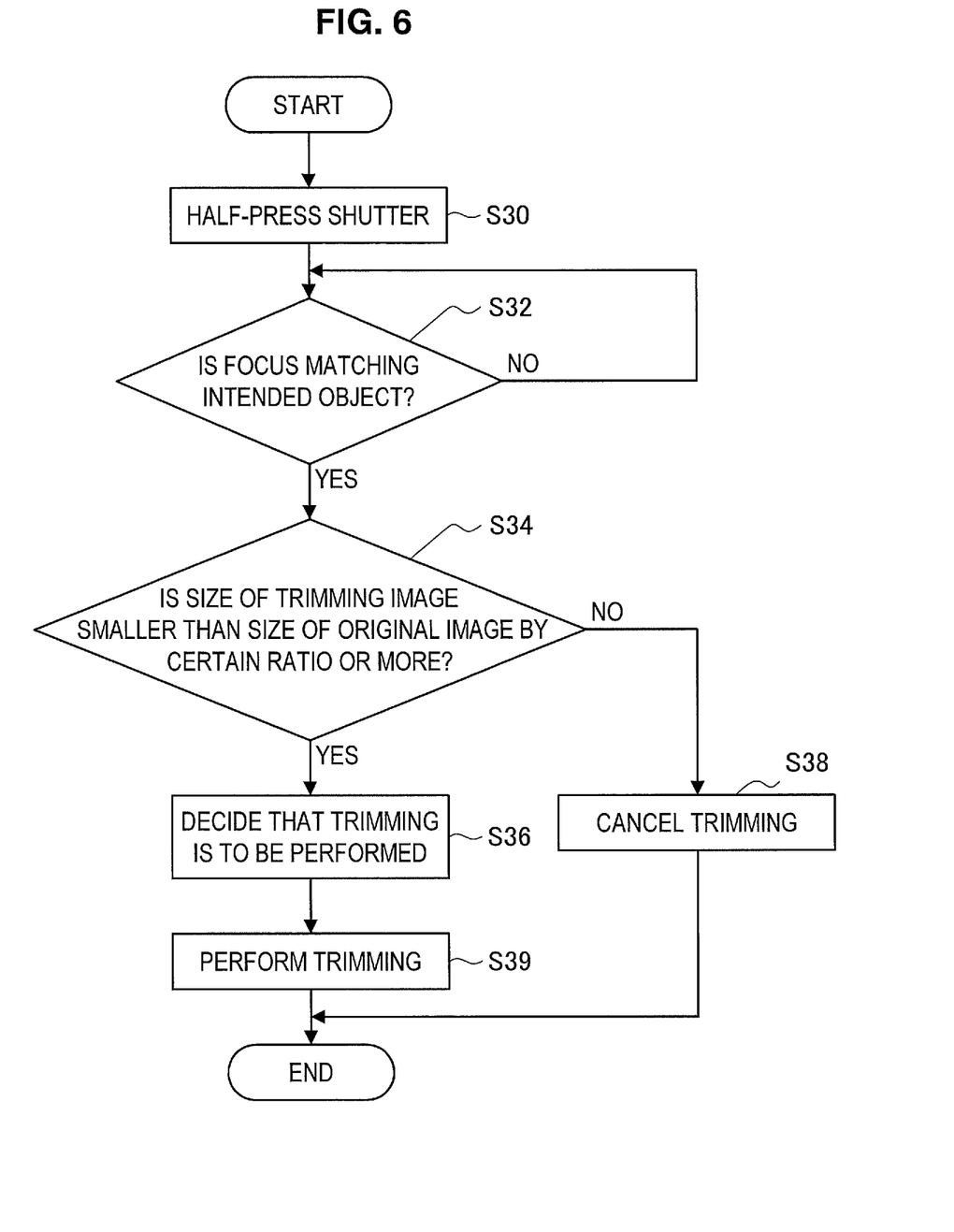
FIG. 6 is a flow chart which shows the processing of a third embodiment of the present disclosure.

FIG. 6 is a flow chart which shows the processing of the third embodiment. First, in step S30, the shutter button 118 is half-pressed by a user. In this way, a focus operation which matches the focus to an object is performed. Next, in step S32, it is decided whether or not the focus is matching an intended object. In the case where the focus is matching an intended object, it proceeds next to step S34. On the other hand, in the case where the focus is not matching an intended object, it stands by at step S32.

In step S34, it is decided whether or not the size of the trimming image is smaller than the size of the original image by a certain ratio or more, in a state where the focus is matching an intended object. Here, whether or not the size of the trimming image is smaller than the size of the original image by a certain ratio or more is decided by comparing the size of the trimming image and the size of the original image, and obtaining a difference, by the image state detection processing unit 124. In the case where the size of the trimming image is smaller than the size of the original image by a certain ratio or more, it proceeds to step S36, and in the case where the size of the trimming image is not smaller than the size of the original image by a certain ratio or more, it proceeds to step S38.

In step S36, since the size of the trimming image is smaller than the size of the original image by a certain ratio or more, it is decided that trimming is to be performed. On the other hand, in step S38, since the size of the trimming image is not smaller than the size of the original image by a certain ratio or more, it is decided to cancel trimming. These decisions are performed by the trimming-decision processing unit 126. After step S36, it proceeds to step S39. In step S39, the trimming processing unit 128 performs a trimming processing, based on a decision result of the trimming-decision processing unit 126.

[3.3. Trimming Decision Based on an Image State Change]

Figure 7:
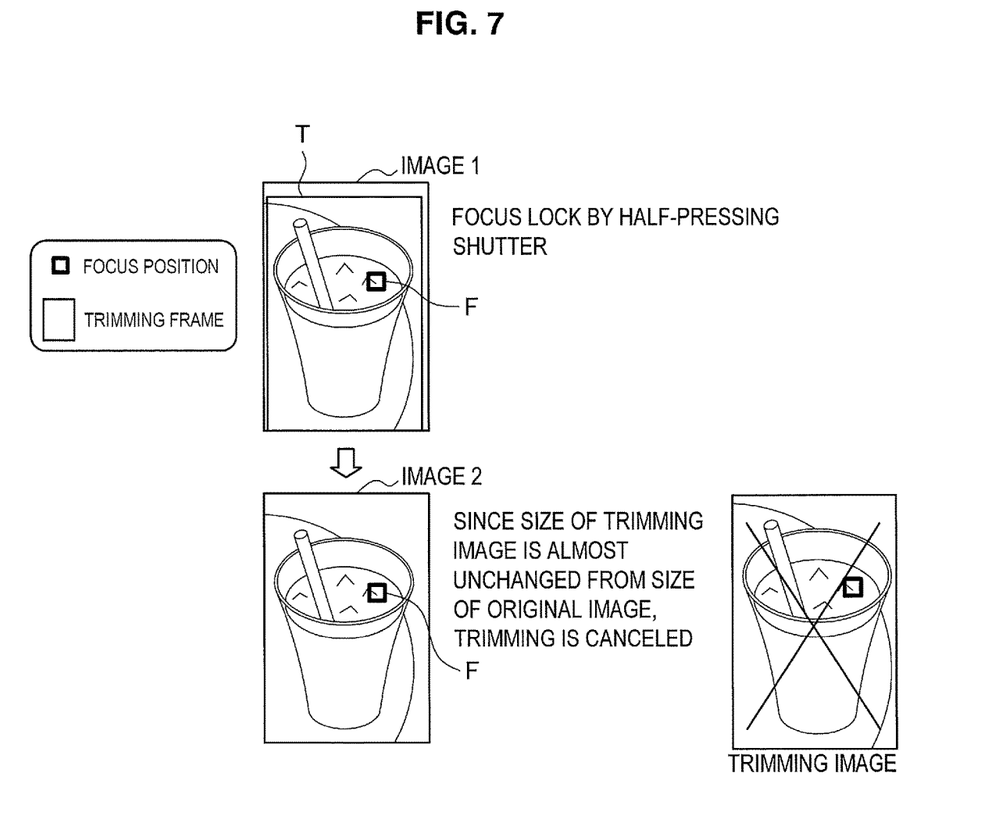
FIG. 7 is a schematic diagram which shows the processes from a focus lock up to a trimming decision.

Next, a trimming decision based on a change of the image state, according to the present embodiment, will be described in detail based on FIG. 7. FIG. 7 is a schematic diagram which shows the processes from a focus lock up to a trimming decision. First, as shown in image 1, a user matches a focus position F to a "drink" in the screen center, and performs a focus lock by half-pressing the shutter button 18. In this way, a trimming frame T is set by matching to the object "drink" which has been focus locked.

Next, it is decided whether or not the image (trimming image) within the trimming frame T in a state which has been focus locked is smaller than the original image O by a certain ratio or more. In the example of image 1, the size of the trimming frame T is slightly smaller than the size of the original image O, and is not smaller than the original image O by a certain ratio or more. Therefore, a decision is performed to cancel trimming by the trimming frame T.

According to the third embodiment, such as described above, in the case where the trimming image is not smaller than the original image by a certain ratio or more, trimming is cancelled, and so it becomes possible to reliably avoid having to perform unnecessary trimming.

Note that, in each of the above described embodiments, while a focus lock has been illustrated by half-pressing the shutter button 118, as the processing for determining a captured image, the processing for determining a captured image is not limited to this. For example, it is possible to cancel trimming in accordance with the state of the image, after a trimming frame has been determined by determining an object focused in a continuous AF mode as a main object.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image processing device including:

an image state detection unit which detects a state of a captured image after a processing for determining a captured image has been performed; and a trimming-decision processing unit which performs a trimming decision of the captured image based on a state of the captured image.

(2)

The image processing device according to (1), further including:

a trimming processing unit which performs a trimming processing of the captured image based on the trimming decision.

(3)

The image processing device according to (1), wherein the processing for determining a captured image is a processing for locking a focus of the captured image.

(4)

The image processing device according to (1), wherein the image state detection unit detects a change of a state of the captured image due to a change of an angular field of the captured image, or a change of a state of the captured image due to a change of orientation of an device which captures the captured image.

(5)

The image processing device according to (4), wherein the trimming-decision unit decides that trimming of the captured image is not performed in a case where the image state detection unit has detected a change of a state of the captured image.

(6)

The image processing device according to (1), wherein the image state detection unit detects whether or not the captured image is a uniform image.

(7)

The image processing device according to (4), wherein the trimming-decision unit decides that trimming of the captured image is not performed in a case where the image state detection unit has detected that the captured image is a uniform image.

(8)

The image processing device according to (1), wherein the image state detection unit detects a dissimilarity between a trimming image of the captured image determined in accordance with the processing for determining a captured image, and an original image prior to trimming.

(9)

The image processing device according to (8), wherein the trimming-decision unit decides that trimming of the captured image is not performed in a case where the image state detection unit has detected that a difference between a trimming image of the captured image and an original image prior to trimming is equal to or less than a prescribed value.

(10)

An image processing method including:

detecting a state of a captured image after a processing for determining a captured image has been performed; and performing a trimming decision of the captured image based on a state of the captured image.

(11)
A recording medium having a program recorded thereon, the program causing a computer to execute a process, the process including:
  detecting a state of a captured image after a processing for determining a captured image has been performed; and
  performing a trimming decision of the captured image based on a state of the captured image.

REFERENCE SIGNS LIST

100 apparatus
124 image state detection processing unit
126 trimming-decision processing unit
128 trimming processing unit

The invention claimed is:

1. An image processing device, comprising:
  one or more processors configured to:
    detect a state of a captured image,
      wherein the state of the captured image corresponds to at least one of color of each of a plurality of regions within the captured image, luminance of each of the plurality of regions within the captured image, or a gyro signal associated with the captured image;
    detect a change of the state of the captured image based on a change of an angular field of the captured image;
    determine that a trimming process of the captured image is to be canceled based on the detection of the change of the state of the captured image; and
    cancel the trimming process of the captured image based on the determination.

2. The image processing device according to claim 1, wherein the one or more processors are further configured to trim the captured image based on a determination that the state of the captured image is unchanged.

3. The image processing device according to claim 1, wherein the one or more processors are further configured to lock a focus of the captured image to determine the captured image.

4. The image processing device according to claim 1, wherein the one or more processors are further configured to detect the change of the state of the captured image based on a change of orientation of a device which captures the captured image.

5. The image processing device according to claim 1, wherein the one or more processors are further configured to detect that the captured image is a uniform image.

6. The image processing device according to claim 5, wherein the one or more processors are further configured to determine to cancel the trimming process of the captured image based on the detection that the captured image is the uniform image.

7. The image processing device according to claim 1, wherein the one or more processors are further configured to compare a trimming image of the captured image determined based on a process to determine the captured image, and an original image prior to the trimming process.

8. The image processing device according to claim 7, wherein the one or more processors are further configured to determine that the trimming process of the captured image is to be canceled based on a determination that a difference between the trimming image of the captured image and the original image is one of equal to or less than a threshold value.

9. The image processing device according to claim 1, wherein the one or more processors are further configured to:
  determine that the captured image is a uniform image based on a determination that a distribution of color and luminance of the captured image is biased; and
  cancel the trimming process of the captured image based on the determination that the captured image is the uniform image.

10. The image processing device according to claim 1, wherein the one or more processors are further configured to:
  detect a motion of an image capturing device based on a gyro sensor; and
  detect that the state of the captured image has changed based on the detected motion.

11. The image processing device according to claim 1, wherein the one or more processors are further configured to determine that the trimming process of the captured image is to be canceled based on a ratio of size of an original image and size of a trimming image of the captured image that is one of equal to or greater than a threshold value.

12. An image processing method, comprising:
  detecting a state of a captured image,
    wherein the state of the captured image corresponds to at least one of color of each of a plurality of regions within the captured image, luminance of each of the plurality of regions within the captured image, or a gyro signal associated with the captured image;
  detecting a change of the state of the captured image based on a change of an angular field of the captured image;
  determining that a trimming process of the captured image is to be canceled based on the detection of the change of the state of the captured image; and
  canceling the trimming process of the captured image based on the determination.

13. A non-transitory computer-readable medium having stored thereon, computer-executable instructions for causing a computer to execute operations, the operations comprising:
  detecting a state of a captured image,
    wherein the state of the captured image corresponds to at least one of color of each of a plurality of regions within the captured image, luminance of each of the plurality of regions within the captured image, or a gyro signal associated with the captured image;
  detecting a change of the state of the captured image based on a change of an angular field of the captured image;
  determining that a trimming process of the captured image is to be canceled based on the detection of the change of the state of the captured image; and
  canceling the trimming process of the captured image based on the determination.

* * * * *